United States Patent
Karlow

[11] Patent Number: 6,019,392
[45] Date of Patent: Feb. 1, 2000

[54] VARIABLE LEVEL SEATBELT ENERGY MANAGEMENT DEVICE

[75] Inventor: James P. Karlow, Milford, Mich.

[73] Assignee: Takata, Inc., Auburn Hills, Mich.

[21] Appl. No.: 09/195,759

[22] Filed: Nov. 18, 1998

[51] Int. Cl.[7] .................................................. B60R 22/28
[52] U.S. Cl. ........................................... 280/806; 280/807
[58] Field of Search ..................................... 280/805, 806, 280/807

[56] References Cited

U.S. PATENT DOCUMENTS

| | | | |
|---|---|---|---|
| 5,012,740 | 5/1991 | Hardt | 102/216 |
| 5,354,488 | 10/1994 | Shtarkman et al. | 252/62.56 |
| 5,452,957 | 9/1995 | Duggan | 384/99 |
| 5,679,280 | 10/1997 | Sasaki et al. | 252/77 |
| 5,718,451 | 2/1998 | White | 280/806 |
| 5,730,531 | 3/1998 | Pinkos et al. | 384/99 |
| 5,749,807 | 5/1998 | Webb | 482/52 |
| 5,765,774 | 6/1998 | Maekawa et al. | 280/806 |
| 5,810,696 | 9/1998 | Webb | 482/52 |
| 5,823,570 | 10/1998 | Lane, Jr. et al. | 280/806 |

*Primary Examiner*—Kenneth R. Rice
*Attorney, Agent, or Firm*—Harness, Dickey & Pierce, P.L.C.

[57] ABSTRACT

A seatbelt energy management device which includes a resistance mechanism coupled to a seatbelt apparatus having a magnetorheological fluid, a permanent magnet having a first magnetic field which orients the magnetorheological fluid to increase the magnetorheological fluid's viscosity, an electromagnet which generates a second magnetic field to cancel the first magnetic field of the permanent magnet to decrease the magnetorheological fluid's viscosity, where the resistance mechanism is controlled by the magnetorheological fluid's viscosity.

23 Claims, 2 Drawing Sheets

VARIABLE LEVEL SEATBELT ENERGY MANAGEMENT DEVICE

BACKGROUND OF THE INVENTION

The present invention relates to an adjustable seatbelt energy management device. More particularly the present invention relates to an adjustable seatbelt energy management device utilizing a polarizable fluid such as a magnetorheological fluid.

As is well known, safety-belts are used for securing the occupants of motor vehicles and aircraft firmly in their seats when the vehicle or aircraft undergoes abnormal acceleration in the transverse direction or deceleration in the direction of travel. It is also known that ideally the safety-belts should not be rigidly secured but should be capable of yielding in a controlled manner. For example, when a collision occurs in the direction of travel, resulting in a force from deceleration and the weight of the traveler, it is beneficial to the safety of the traveler to have the safety-belt dissipate some of the energy. The present invention utilizes a novel energy management system employing polarizable fluids such as magnetorheological fluids (hereinafter "MR" fluids).

MR fluids, such as ferromagnetic fluids, are suspensions of small magnetizable particles (normally a metal such as iron) in a fluid (normally an oil). The magnetizable particles align themselves with reference to an applied magnetic field. The degree of alignment is proportional to the strength of the magnetic field. This particle alignment will effect the viscosity of the fluid. Normally, MR fluids are free flowing fluids with a viscosity similar to oil. When a magnetic field is applied the viscosity will increase, almost to the point of a solid, due to particles forming a dense network of particle chains. The degree of change is proportional to the magnitude of the applied magnetic field. MR fluids also react very rapidly to the applied magnetic field. The response time of MR fluids is on the order of a few milliseconds and is useful in speed dependant applications such as the control of a seat belt restraint during a collision.

MR fluids are superior to other polarizable fluids, such as electrorheological fluids (hereinafter "ER fluids"), in applications of the present invention because they are much stronger, stable, and easier to use. MR fluids are 20–50 times stronger than ER fluids and may be operated using low voltage sources such as a 12 volt car battery. MR fluids are also far less susceptible to contaminants and extremes in temperature than ER fluids. MR fluids are utilized in the preferred embodiments of the present invention.

SUMMARY OF THE INVENTION

The present invention is directed towards an electrically adjustable seatbelt energy management device using a polarizable fluid such as an MR fluid. In the preferred embodiment, an MR fluid such as a ferromagnetic fluid, a permanent magnet, and electromagnet are used to control the rotational drag of a seatbelt retractor energy management device or the linear travel of an energy management device useable in line with a seatbelt buckle or with a retractor spool.

The energy management device uses magnetic fields to control the viscosity of a polarizable fluid such as a ferromagnetic fluid. By varying the viscosity of the ferromagnetic fluid, the force required to cause the fluid to flow either through an orifice or through an impeller is modulated. This principle, as detailed below, can be applied to controlling the payout of seatbelt webbing or the elongation of a seatbelt buckle attachment for the purpose of managing the energy of an occupant in a vehicle crash.

In operation, a permanent magnet is located near an orifice, a flow restricted area adjacent an impeller, or in a housing in communication with the ferromagnetic fluid. The permanent magnet acts on the ferromagnetic fluid causing it to reach a maximum viscosity. An electromagnet is located near the permanent magnet such that the magnetic fields of both can effect the region containing the ferromagnetic fluid. When an adjustment is required to decrease the amount of force for a given rate of belt payout or elongation, an electric current either continuous or pulsed, is applied to the electromagnet. As the current flows through the electromagnet, a magnetic field is produced by the electromagnet. The field generated by the electromagnet has been configured to act in opposition to the field generated by the permanent magnet, canceling the magnetic field of the permanent magnet and reducing the viscosity of the ferromagnetic fluid. As the viscosity of the ferromagnetic fluid is reduced the rotational drag or linear drag on a piston type energy management device is decreased. Less force is then required to cause seatbelt webbing to payout or a buckle mounting to elongate.

DETAILED DESCRIPTION OF THE PREFERRED EMBODIMENT

Figure 1:
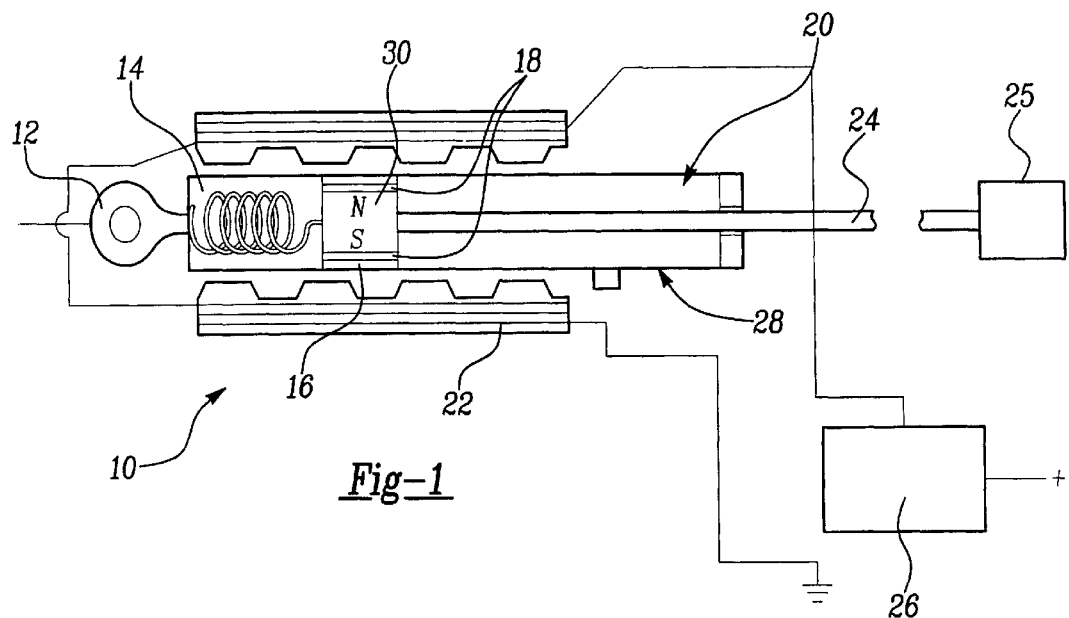
FIG. 1 is a diagrammatic illustration of a first embodiment of the variable level seatbelt energy management device of the present invention.

FIG. 1 is a diagrammatic illustration of a first embodiment of the variable level seatbelt energy management device of the present invention shown generally as 10. The device 10 is applied to a seatbelt buckle mounting by cylinder shaft 24 and is attached to the frame or other stable fixed structure in a vehicle by mounting ring 12. Included in the device 10 is a cylinder 28 having a piston 16 with orifices 18 formed in the piston 16. The orifices 18 allow the flow of a polarizable fluid, such as a ferromagnetic fluid 20, from one chamber to the other of the cylinder 28. The shaft 24 of the cylinder 28 and piston 16 will move with reference to an exterior seat belt load 25. In this particular embodiment of the device 10, the load 25 will be provided by a seatbelt buckle mounting, although the load 25 may also comprise a seatbelt retractor or similar seatbelt device. A return spring 14 is provided to the piston 16 to reset the system when the load is removed.

The piston 16 incorporates a permanent magnet 30 which exerts a magnetic field on the surrounding ferromagnetic fluid 20, polarizing the ferromagnetic fluid 20 and increasing its viscosity. As discussed previously the viscosity of the ferromagnetic fluid 20 may be varied by a magnetic field and increased to the point of a solid. The cylinder 28 containing the piston 16 is surrounded by an electromagnet 22. The electromagnet 22 generates a magnetic field which opposes the magnetic field of the permanent magnet 30. This interaction between the electromagnet 22, permanent magnet 30, and the ferromagnetic fluid 20 will control the amount of viscosity for the ferromagnetic fluid 20 and its flow through the orifices 18 in the piston 16. The higher the viscosity of the ferromagnetic fluid 20 the more resistance to flow. When a force is applied to shaft 24 of the cylinder 28 the flow of the ferromagnetic fluid 20 through the orifices 18 can be used to present varied levels of resistance to movement and force.

The application of current to the electromagnet 22 will determine the amount of magnetic field it generates, the viscosity of the ferromagnetic liquid 20, and thus the piston's 16 resistance to movement. A controller or power supply 26 controls the amount of current to the electromagnet 22. The controller 26 may apply a switched current, continuous DC current, or any other type of electrical current profile known in the art. By controlling the current to the electromagnet 22, the controller 26 can dynamically vary the resistance of the cylinder 28 to motion. The cylinder 28 may be controlled to withstand motion, present no resistance to motion or supply a resistance somewhere in between. The controller 26 may also dynamically provide resistance curves during an impact by varying the current to the electromagnet 22 in response to external sensors. Because of the ferromagnetic fluid's 20 quick response time to external magnetic fields, the resistance of the cylinder can be varied at different time intervals during a collision. A traveler could thus be "braked" in a controlled manner during such a collision where energy is dissipated by the cylinder 28 in the manner most protective of the traveler.

In alternate embodiments of the present invention, the controller 26 will accept inputs such as seat position, occupant weight and height, crash severity, and air bag deployment to better control the seatbelt attachment. For example, during the deployment of an air bag, the controller 26 will insure that the passenger is placed in the most optimal position for impact on the air bag.

A safety feature of the present invention is its "fail-safe" performance. The permanent magnet 30 has no need of an outside source of energy and is independent of a vehicle's electrical system. Thus if the electrical system fails in a vehicle, the permanent magnet 30 will continue to exert a magnetic field on the ferromagnetic fluid 20 to maintain the high viscosity of the ferromagnetic fluid 20. The ferromagnetic fluid 20 will resist flow through the orifices 18 and the piston 16 will resist movement, securing a seatbelt attachment device. The viscosity of the ferromagnetic fluid, and thus the resistance to movement of the piston 16 will only decrease when the electromagnet 22 is provided with current. In the event of a collision and the failure of an electrical system, the device 10 will provide fail-safe method for affixing a seat belt mechanism.

Figure 2:
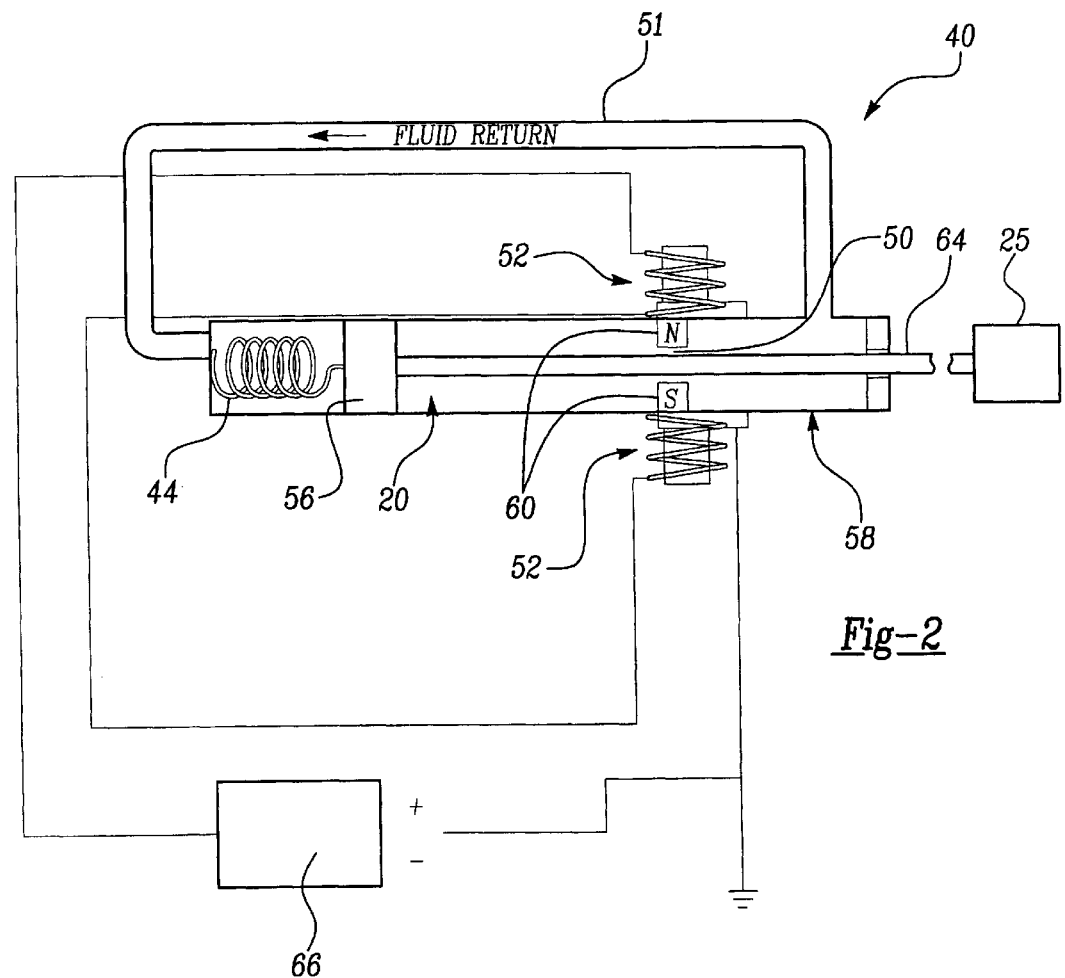
FIG. 2 is a diagrammatic illustration of a second embodiment of the variable level seatbelt energy management device of the present invention.

FIG. 2 is a diagrammatic view of a second embodiment 40 of the present invention. This second embodiment 40 operates on the same principles as the first embodiment 10 but is configured in a different manner. A cylinder 58 having a piston 56 is filled with ferromagnetic fluid 20 and secured to a seatbelt attachment 25 by piston shaft 64. An orifice 50 is configured between permanent magnets 60 to allow the flow of ferromagnetic fluid 20 through the orifice 50 and fluid return pipe 51. Fluid return pipe 51 allows for the flow of the ferromagnetic fluid 20 from one end of the cylinder 58 to the other, as piston 56 moves through the length of the cylinder 58. A return spring 44 is coupled to the piston 56 to reset the system when the load is removed.

Electromagnets 52 are positioned around the cylinder 58 to generate a magnetic field which cancels the magnetic field of the permanent magnets 60. In an operation similar to the first embodiment, the viscosity of the ferromagnetic fluid 20 and its resistance to flow can be varied. This variation in viscosity will change the resistance to movement of the piston 56. The cylinder shaft 64 is coupled to the piston 56 and an exterior seat belt load 25. As a load is transmitted from the cylinder shaft 64, the piston is moved within the cylinder 58, forcing the flow of the ferromagnetic fluid though the orifice 50 of cylinder 58 and fluid return line 51. The current is applied to the electromagnet 22 by a controller 66 similar to the controller 26 of the first embodiment.

Figure 3:
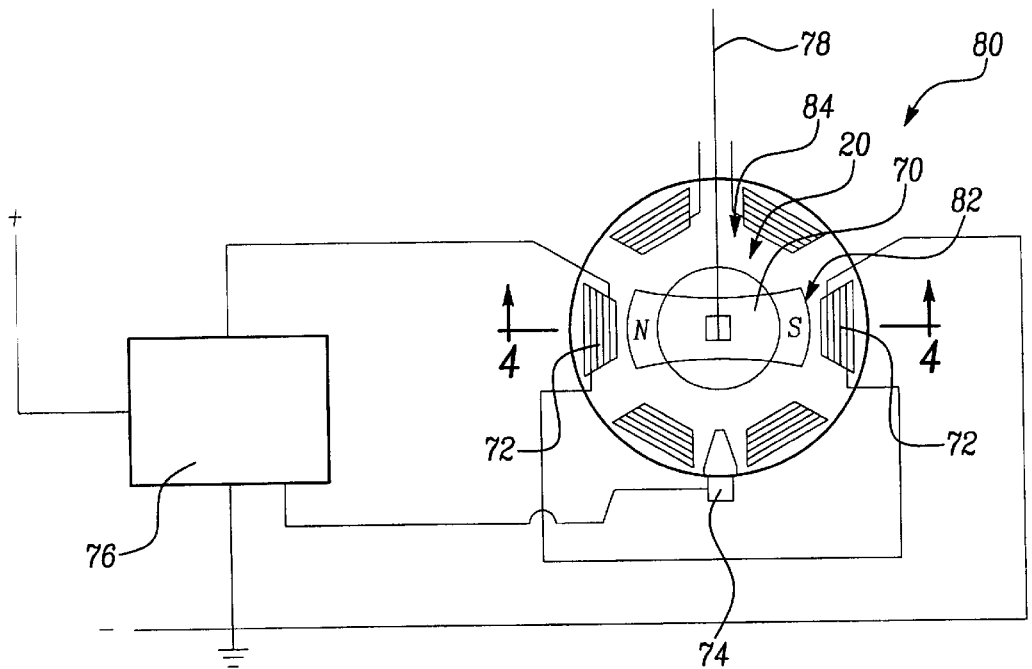
FIG. 3 is a diagrammatic illustration of a third embodiment of the variable level seatbelt energy management device of the present invention.
Figure 4:
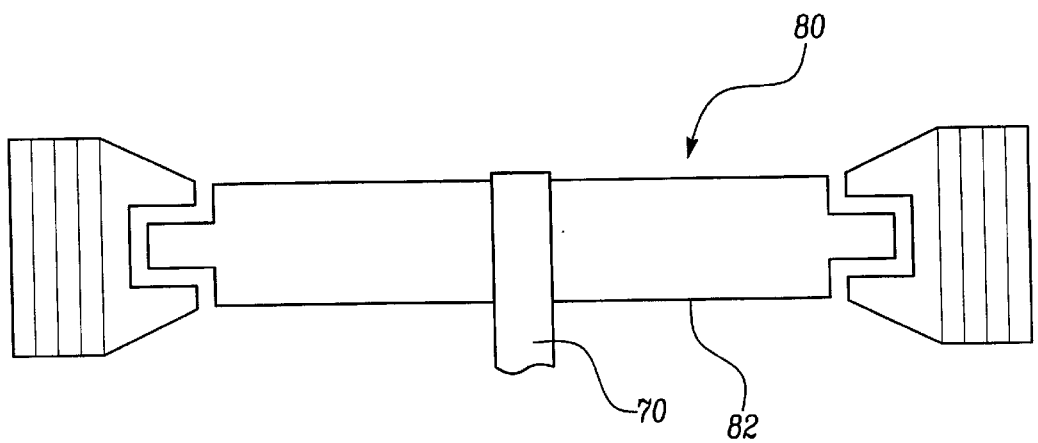
FIG. 4 is a diagrammatic illustration of the spindle used in the third embodiment of the present invention.

FIG. 3 is a diagrammatic drawing of a third embodiment 80 of the present invention utilizing a rotating configuration. The third embodiment 80 applies the concept of electrically variable energy management to a seatbelt retractor by controlling rotational drag. A permanent magnet 70 is mounted as part of a rotational member 82 attached to a seatbelt retractor spool 80. This rotational member 82 is immersed in a ferromagnetic fluid reservoir 84 between the poles of electromagnet 72. When the electromagnet 72 is not energized, the viscosity of the ferromagnetic fluid 20 is at a maximum due to the influence of the magnetic field from the permanent magnet 70 and rotational drag is therefore at a maximum. As an electric current from controller 76 is applied through the coils of wire on the electromagnet, a magnetic field is generated in the opposite direction with reference to the magnetic field generated by the permanent magnet 70. Viscosity of the ferromagnetic fluid 20 is decreased and rotational drag on the shaft connected to the retractor spool 80 is decreased.

To enhance control in this third embodiment 80, multiple electromagnets may be used, each individually pulsed by the controller 76 logic to adjust rotational drag. The operation is analogous to a stepper motor, where the position of the rotor/permanent magnet is known and current is applied to alternating electromagnets 72. A magnetic sensor 74 is included in the enhanced configuration to provide permanent magnet 70 position information to the control module 76 so the application of the current can be properly pulsed and directed to adjust and control drag as the shaft turns. As the permanent magnet 70 rotates, current can be shifted to electromagnets 72 which are in position to control and/or cancel the magnetic field of the permanent magnet 70. Adjacent electromagnets 72 may also concurrently carry current when the permanent magnet 70 is positioned between electromagnets 72. Thus as the permanent magnet 70 rotates, feedback informs the controller 76 of the position of the permanent magnet 70 and the controller 76 pulses the electromagnets 72 in position to effect the magnetic field of the permanent magnet 70. In this way the resistance presented by the rotating member 82 can be controlled at all rotational positions in a smooth manner. In alternate embodiments, encoders, resolvers, or other rotary positioning sensors may be used to provide permanent magnet 70 position.

The description of the present invention is merely exemplary in nature and is in no way intended to limit the invention or its uses. Moreover, the description, while depicting a system designed to utilize an MR fluid, is intended to adequately teach one skilled in the art to make and use a device using ER fluids having opposing electric fields. Various changes and modifications may be made without departing from the spirit and scope of the invention as defined in the following claims.

I claim:

1. A seatbelt energy management device comprising:
    a resistance mechanism coupled to a seatbelt apparatus having a magnetorheological fluid, a permanent magnet having a first magnetic field which orients said magnetorheological fluid, increasing said magnetorheological fluid's viscosity;

an electromagnet which generates a second magnetic field to cancel said first magnetic field of said permanent magnet to decrease said magnetorheological fluid's viscosity, wherein resistance of said resistance mechanism is controlled by said magnetorheological fluid's viscosity; and a current generator to supply current to said electromagnet to generate said first magnetic field.

2. The seatbelt energy management device of claim 1, wherein said resistance mechanism is a cylinder including a piston having an orifice, and wherein said magnetorheological fluid flows through said orifice as said piston moves, whereby as said magnetorheological fluid's viscosity increases, said piston's resistance to motion will increase.

3. The seatbelt energy management device of claim 1, wherein said cylinder is further coupled to a seatbelt attachment by a cylinder shaft.

4. The seatbelt energy management device of claim 1, wherein said seatbelt apparatus is a seatbelt buckle attachment.

5. The seatbelt energy management device of claim 1, wherein said seatbelt apparatus is a seatbelt retractor.

6. The seatbelt energy management device of claim 1, wherein said resistance mechanism is a cylinder having an orifice, piston, and said fluid return pipe, and wherein said magnetorheological fluid flows through said orifice and fluid return pipe as said piston moves, whereby as said magnetorheological fluid's viscosity increases said piston's resistance to motion will increase.

7. The seatbelt energy management device of claim 6, wherein said fluid return pipe connects a first end of said cylinder to a second end of said cylinder.

8. The seatbelt energy management device of claim 6, wherein said piston generally creates a seal against the walls of said cylinder.

9. The seatbelt energy management device of claim 1, wherein said resistance mechanism is a rotational member immersed in said magnetorheological fluid.

10. The seatbelt energy management device of claim 9 further comprising an array of electromagnets positioned radially about said permanent magnet.

11. The seatbelt energy management device of claim 10 further comprising a sensor which detects the radial position of said permanent magnet.

12. The seatbelt energy management device of claim 11 wherein said sensor is a magnetic sensor.

13. The seatbelt energy management device of claim 11, wherein said sensor is an encoder.

14. The seatbelt energy management device of claim 1, wherein said magnetorheological fluid is a ferromagnetic fluid.

15. The seatbelt energy management device of claim 1, wherein said current generator generates a constant current.

16. The seatbelt energy management device of claim 1, wherein said current generator generates a pulsed current.

17. The seatbelt energy management device of claim 1, wherein said current may be dynamically adjusted as a function of collision deceleration speed to control the resistance of said resistance mechanism, whereby said seat belt energy management device may absorb the energy of said collision in a controlled manner.

18. The seatbelt energy management device of claim 1 further comprising a sensor for detecting collision speed.

19. The seatbelt energy management device of claim 1 further comprising a spring coupled to an end of said cylinder and coupled to said piston to reset piston position.

20. A seatbelt restraint device comprising:

a cylinder filled with a magnetorheological fluid, a piston having an orifice located within said cylinder, said piston slidingly coupled to the interior walls of said cylinder, wherein the movement of said piston causes said magnetorheological fluid to flow through said orifice;

a member coupled to said piston for attachment to a seat belt attachment;

a permanent magnet located adjacent to said orifice exerting a first magnetic field on said magnetorheological fluid, wherein the viscosity of said magnetorheological fluid is increased and resistance to movement of said piston is increased;

an electromagnet generating a second magnetic field in opposition to said first magnetic field, wherein the viscosity of said magnetorheological fluid is decreased and said resistance to movement of said piston is decreased; and a current generator to supply current to said electromagnet to generate said second magnetic field.

21. The seatbelt restraint device of claim 20, wherein said current generator varies said current in said electromagnet in response to a collision speed to absorb energy from said collision in a controlled manner.

22. A seatbelt restraint device comprising:

a cylinder filled with a magnetorheological fluid, an orifice located within said cylinder;

a fluid pipe connecting a first end of said cylinder to a second end of said cylinder.

a piston located within said cylinder and slidingly coupled to the interior walls of said cylinder, wherein the movement of said piston causes said magnetorheological fluid to flow through said orifice and said fluid pipe;

a member coupled to said piston for attachment to a seat belt mechanism;

a permanent magnet located adjacent to said orifice exerting a first magnetic field on said magnetorheological fluid, wherein the viscosity of said magnetorheological fluid is increased and resistance to movement of said piston is increased;

an electromagnet generating a second magnetic field in opposition to said first magnetic field, wherein the viscosity of said magnetorheological fluid is decreased and said resistance to movement of said piston is decreased; and a current generator to supply current to said electromagnet to generate said second magnetic field.

23. A seatbelt retraction device comprising:

a spool of seatbelt webbing, a permanent magnet coupled to said spool of seatbelt webbing, immersed in a magnetorheological fluid inside a chamber, and exerting a first magnetic field;

at least one electromagnet located adjacent said chamber exerting a second magnetic field in opposition to said first magnetic field, wherein the viscosity of said magnetorheological fluid is controlled by the interaction of said first and second magnetic fields, said viscosity of said magnetorheological fluid controlling a force needed to rotate said permanent magnet and said spool of seatbelt webbing, wherein payout of said spool of seatbelt webbing may be controlled;

a current generator to supply current to said electromagnet to generate said second magnetic field.

* * * * *